(12) United States Patent
Kaku

(10) Patent No.: US 7,245,818 B2
(45) Date of Patent: Jul. 17, 2007

(54) MOVING IMAGE REPRODUCING APPARATUS

(75) Inventor: Junya Kaku, Itami (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 816 days.

(21) Appl. No.: 09/803,012

(22) Filed: Mar. 12, 2001

(65) Prior Publication Data

US 2001/0028781 A1 Oct. 11, 2001

(30) Foreign Application Priority Data

Mar. 13, 2000 (JP) .............................. 2000-068375

(51) Int. Cl.
*H04N 7/00* (2006.01)
*H04N 7/26* (2006.01)

(52) U.S. Cl. ......................................... 386/46; 386/124

(58) Field of Classification Search ................. 386/46, 386/124, 125, 107, 117, 1, 4, 40, 64, 74
See application file for complete search history.

(56) References Cited

U.S. PATENT DOCUMENTS 5,134,499 A * 7/1992 Sata et al. ................... 386/109
5,319,794 A * 6/1994 Fujita ........................... 712/42
5,905,842 A * 5/1999 Kajimoto ..................... 386/52
2002/0180715 A1* 12/2002 Konuta et al. ............... 345/204

FOREIGN PATENT DOCUMENTS

| JP | 06-103699 | 4/1994 |
| JP | 7-306756 | 11/1995 |

OTHER PUBLICATIONS

Japanese Office Action dated Nov. 12, 2002.

* cited by examiner

*Primary Examiner*—Robert Chevalier
(74) *Attorney, Agent, or Firm*—Westerman, Hattori, Daniels & Adrian, LLP.

(57) ABSTRACT

A moving image reproducing apparatus includes a CPU mounted with a real-time OS. When a set key is pressed, the CPU executes concurrently a transfer process of compressed image data and sound data from a magneto-optical disk to an SDRAM and a reproduce process of compressed image data and sound data stored in the SDRAM. Herein, the reproduce process includes a process of setting a command of transferring the compressed image data and sound data to an instruction list and a process of outputting the compressed image data and sound data stored in the SDRAM. Meanwhile, the transfer process includes a process of seeking a desired address on the magneto-optical disk by making reference to the instruction list and a process of writing desired data to a desired address in the SDRAM by making reference to the instruct on list.

5 Claims, 16 Drawing Sheets

| CHUNK NO. | OFFSET | SIZE (byte) |
|---|---|---|
| 0 | aofst[0] | asz[0] |
| 1 | aofst[1] | asz[1] |
| 2 | aofst[2] | asz[2] |
| 3 | aofst[3] | asz[3] |
| 4 | aofst[4] | asz[4] |
| ⋮ | ⋮ | ⋮ |

| FRAME NO. | OFFSET | SIZE (byte) |
|---|---|---|
| 0 | mofst[0] | msz[0] |
| 1 | mofst[1] | msz[1] |
| 2 | mofst[2] | msz[2] |
| 3 | mofst[3] | msz[3] |
| 4 | mofst[4] | msz[4] |
| ⋮ | ⋮ | ⋮ |

| MAIL NO. | OPERATION | FILE ADDRESS | SDARM ADDRESS | SIZE (byte) |
|---|---|---|---|---|
| 0 | SEEK | aofst[chk]+acnt | --- | --- |
| 1 | WRITE | --- | apreptr | asz[chk]-acnt |
| 2 | SEEK | mofst[prefrm] | --- | --- |
| 3 | | | | |
| | ⋮ | ⋮ | | ⋮ |

MOVING IMAGE REPRODUCING APPARATUS

BACKGROUND OF THE INVENTION

1. Field of the Invention

This invention relates to moving image reproducing apparatuses and, more particularly, to a moving image reproducing apparatus to be applied for a digital camera for reproducing a moving image comprising still images in a plurality of frames.

2. Description of the Prior Art

In the conventional digital camera having the function to reproduce moving images, when reproducing a moving image, still image signals in frames are first read out of a recording medium. The still image signals thus read are signal-processed and displayed on the display. Herein, serially executed are the processes of seeking a desired address of the recording medium, reading still image signals from the desired address and displaying still images on the basis of read still image signals. However, where the still image signals in frames are recorded in a sporadic form over the recording medium, the seek process takes longer time as the distance to an access address increases. Accordingly, in the prior art executing the seek, read and display processes serially, freeze possibly occurs in the reproduced moving image.

SUMMARY OF THE INVENTION

Therefore, it is a primary object of the present invention to provide a moving image reproducing apparatus capable of preventing against freeze in the moving images reproduced.

According to this invention, a moving image reproducing apparatus for reproducing a moving image signal from a recording medium, comprises: an internal memory for temporarily storing the moving image signal; and a multi-task CPU for concurrently executing, when inputted with a reproduce instruction, a transfer process to transfer a predetermined amount per time of the moving image signal from the recording medium to the internal memory and a reproduce process to reproduce the moving image signal stored in the internal memory.

When a reproduce instruction is inputted by the input means, the multi-task CPU concurrently makes a transfer process of transferring a predetermined mount per time of a moving image signal from the recording medium to the internal memory and a reproduce process of reproducing the moving image signal stored in the internal memory. Consequently, even if the transfer process for the moving image signal takes a time, the delay in time will not have effects upon the reproduce process. Accordingly, it is possible to properly reproduce a moving image signal without causing freeze therein.

In a certain embodiment of the invention, the reproduce process includes a set process to set a plurality of operation commands to a table and an output process to read out and output the moving image signal stored in the internal memory. On the other hand, the transfer process includes a seek process to seek a desired address on the recording medium by making reference to the table and a signal transfer process to transfer the moving image signal corresponding to the predetermined amount from the recording medium to the internal memory by making reference to the table. That is, a plurality of operation commands are set to the table by the set process as part of the reproduce process. In the transfer process concurrent with the reproduce process, a desired address is sought by making reference to the table, wherein the moving image signal is transferred in a predetermined amount per time to the internal memory by making reference to the table. The moving image signal transferred to the table is outputted by the output process as part of the reproduce process. In this manner, because a plurality of operation commands are stored in the table to fix the operation to be made in the transfer process, even where there encounters a delay in time due to the seek process, a signal transfer process can be promptly executed after the seek.

Preferably, the reproduce process further includes a comparison process to compare the number of unexecuted operation commands already set in the table but not yet executed with a predetermined value and a wait process to wait for a predetermined time when the number of the unexecuted operation commands is greater than the predetermined value. When the number of unexecuted operation commands is increased, a wait process is effected. That is, the reproduce process is temporarily suspended. This makes the transfer process intensive to eliminate the delay in the transfer process. Incidentally, the predetermined value preferably relies on a moving-image frame rate.

Preferably, the set process includes an update process to cyclically update a transfer destination address of the moving image signal and an address set process to set the transfer destination address updated by the update process to the table. By cyclically updating the transfer destination address, a moving image signal can be reproduced in amount exceeding the capacity of the internal memory.

Preferably, the moving image signal includes a plurality of compressed still image signals, and the output process including a decompress process to decompress each of the compressed still image signals. By including the decompress process in part of the reproduce process, such an image signal as requiring a decompression process can be properly reproduced regardless of time delay in the transfer.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an illustrative view showing a sound-data offset table;

FIG. 5 is an illustrative view showing an image-data offset table;

FIG. 6 is an illustrative view showing an instruction list;

DETAILED DESCRIPTION OF THE PREFERRED EMBODIMENTS

Figure 1:
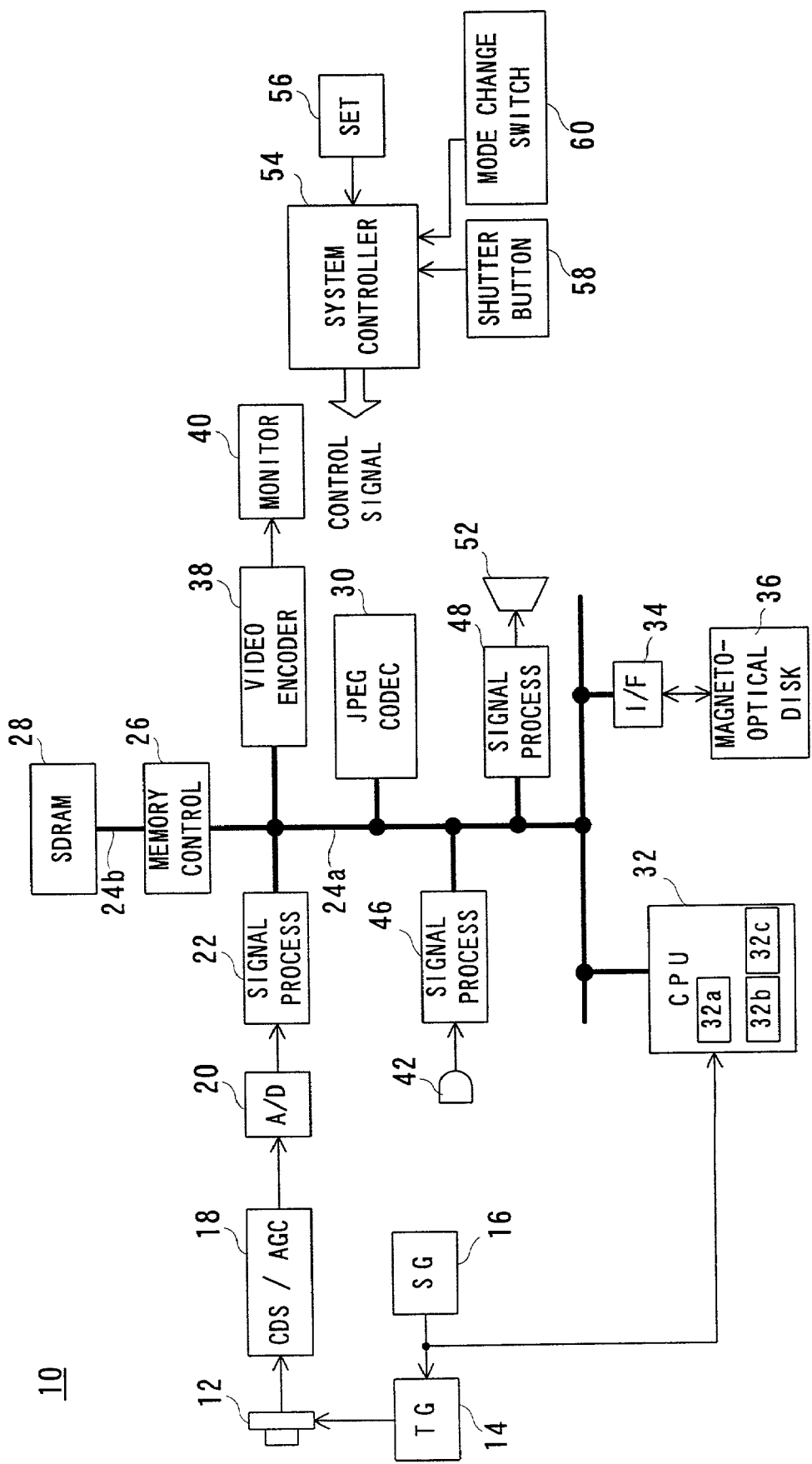
FIG. 1 is a block diagram showing an embodiment of the present invention.

Referring to FIG. 1, a digital camera 10 of this embodiment includes a CCD imager 12. The CCD imager 12 has a color filter (not shown) attached at a front surface thereof. The optical image of a subject is illuminated to the CCD imager 12 through the color filter.

When a mode change switch 60 is shifted toward "CAMERA", a system controller 54 establishes for a camera mode. A timing generator (TG) 14 produces timing signals on the basis of the vertical and horizontal synchronizing signals outputted from a signal generator (SG) 16, to drive the CCD imager 12 by the thin-out scheme. As a result, low-resolution camera signals in frames are outputted from the CCD imager 12 at an interval of $\frac{1}{30}$th of a second. The output camera signal is subjected to well-known noise removal and level adjustment by a CDS/AGC circuit 18, and then converted into camera data as a digital signal by an A/D converter 20. A signal processing circuit 22 performs YUV conversion on the camera data outputted from the A/D converter 20, thereby generating YUV data. Because the CCD imager 12 outputs camera signals for each frame at an interval of $\frac{1}{30}$th of a second, the YUV data (still image data) for each frame is also outputted at an interval of $\frac{1}{30}$th of a second. The signal processing circuit 22 outputs the still image data thus produced, together with a write request, to a memory control circuit 26.

Figure 2:
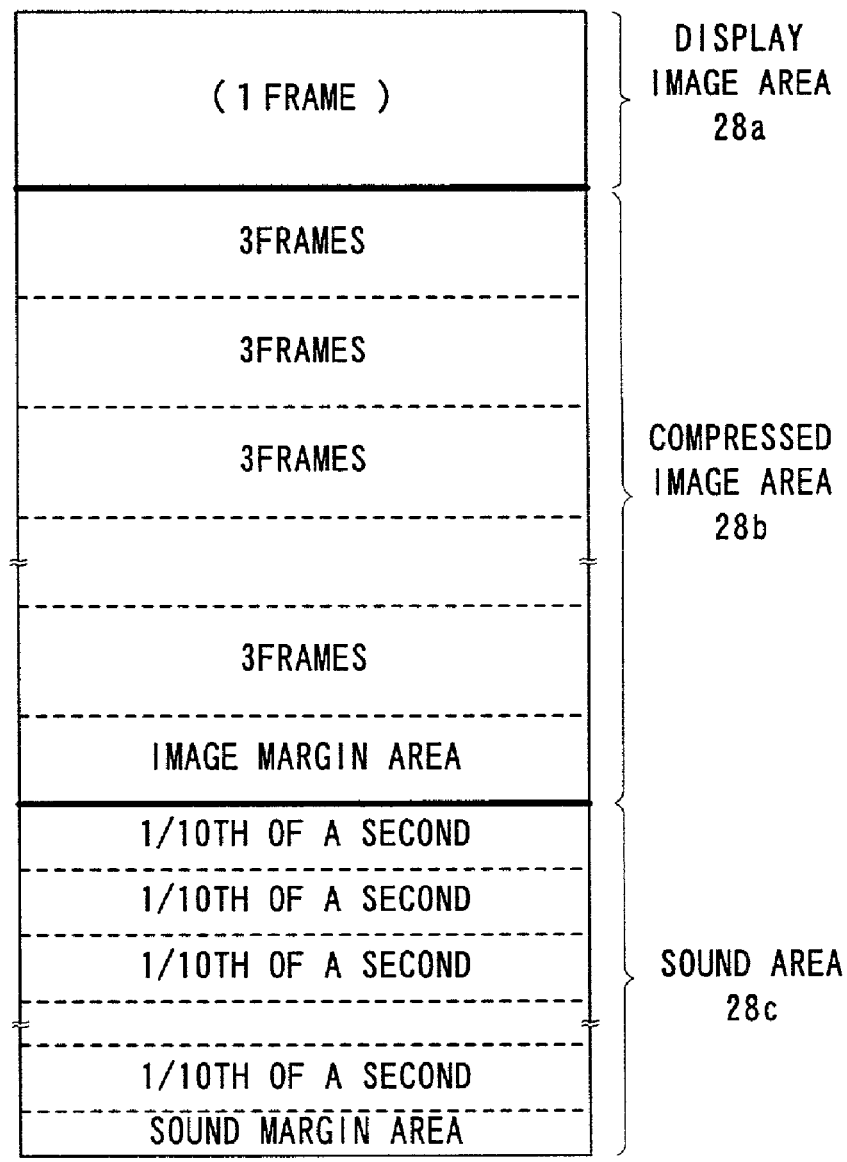
FIG. 2 is an illustrative view showing a mapping state in an SDRAM.

A memory control circuit 26 writes the still image data to an SDRAM 28 in response to the write request. The SDRAM 28 has a display image area 28a as shown in FIG. 2, to write therein the still image data. Because the display image area 28a has a capacity of only one frame, the still image data for each frame is updated at an interval of $\frac{1}{30}$th of a second. On the other hand, a video encoder 38 outputs read requests at an interval of $\frac{1}{60}$th of a second. In turn, the memory control circuit 26 reads still image data from the display image area 28a at an interval of $\frac{1}{60}$th of a second. The read still image data for each frame is supplied to the video encoder 38 through a bus 24a.

The video encoder 38 converts the input still image data for each frame into a composite image signal and supplies the converted composite image signal to a monitor 40. As a result, a moving image (through-image) of the subject is displayed real-time on the monitor 40.

When the operator presses shutter button 58, the system controller 54 instructs the CPU 32 to record a moving image and sound. Thereupon, the CPU 32 generates image compression commands and sound processing commands at an interval of $\frac{1}{30}$th of a second. The image compression commands are supplied to a JPEG CODEC 30 while the sound processing commands are to the signal processing circuit 46.

The JPEG CODEC 30 outputs a read request to the memory control circuit 26 in response to the image compression command. Consequently, the still image data stored on the display image area 28a of the SDRAM 28 is read out at an interval of $\frac{1}{30}$th of a second by the memory control circuit 26. The read still image data is provided to the JPEG CODEC through the bus 24a where it is subjected to JPEG compression. The JPEG CODEC 30, each time of producing a frame of compressed image data, requests the memory control circuit 26 to write the compressed image data for each frame to the memory control circuit 26. In response, the memory control circuit 26 writes the compressed image data for each frame into a compressed-image area 28b shown in FIG. 2.

On the other hand, the signal processing circuit 46 fetches a sound signal through a microphone 42 in response to a sound processing command. The fetched sound signal is subjected to a predetermined process, and the processed sound data is outputted, together with a write request, to the memory control circuit 26. Because the sound processing commands are provided at an interval of $\frac{1}{30}$th of a second, sound data in amount of $\frac{1}{30}$th of a second, i.e. 266 bytes, is outputted to the memory control circuit 26. The memory control circuit writes the 266-byte sound data to a sound area 28c shown in FIG. 2, in response to the write request.

The CPU 32 also requests the memory control circuit 26 to read out data. In responsive to the given request, the memory control circuit 26 reads out, alternately, sound data in amount of $\frac{1}{10}$th of a second and image data in amount of three frames, and records the read data onto a removable disk recording medium 36, such as a magneto-optical disk 36, through an I/F 34.

In a memory card 36, a QuickTime-formed file header is created in response to the first operation of the shutter button 58. The sound data and image data read from the SDRAM 28 are written to a position following the file header. This alternately forms a sound chunk comprising $\frac{1}{10}$th-of-a-second sound data and an image chunk comprising 3-frames compressed image data. One sound chunk and the following one image chunk correspond to each other. To an index chunk formed at the last of the file is written a start address of each sound chunk and start address of the compressed image data for each frame. Due to the index chunk, the sound data is put under control at an interval of $\frac{1}{10}$th of a second while the compressed image data is put under control at an interval of one frame.

When the shutter button 58 is shifted off, the CPU 32 suspends the JPEG CODEC 30 from outputting image compression commands and the signal processing circuit 46 from outputting sound processing commands. That is, the data write process to the SDRAM 28 is suspended. However, the recording process is ended when all the data in the SDRAM 28 has been recorded onto the magneto-optical disk 36.

Incidentally, the file management scheme in the magneto-optical disk 36 employs an MS-DOS FAT scheme to sporadically record the QuickTime file on a cluster-by-cluster basis.

Figure 3:
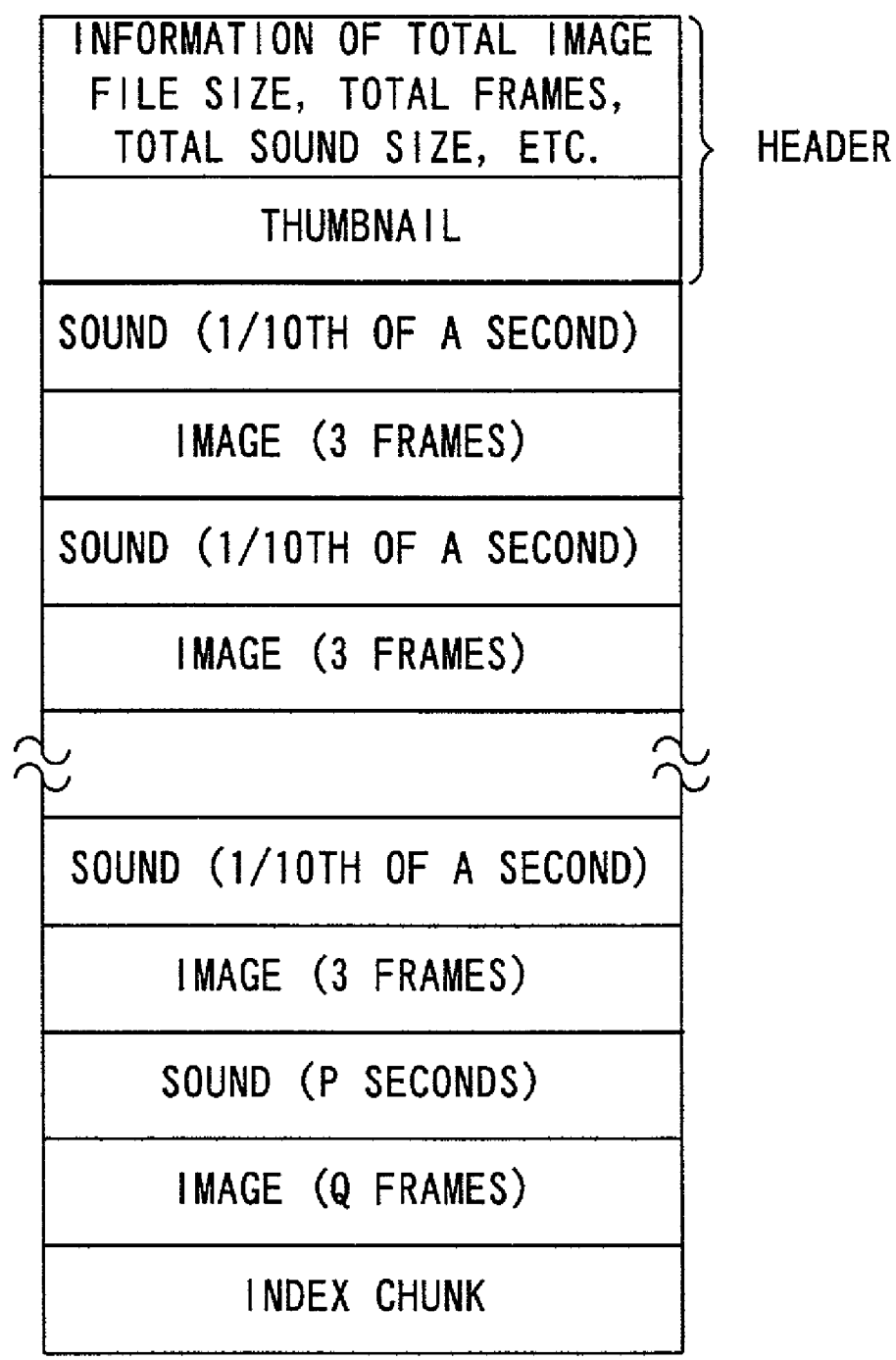
FIG. 3 is an illustrative view showing a QuickTime file.

When the operator shifts the mode set switch toward "REPRODUCE" and operates a set key 56, reproduced is a QuickTime file having been recorded in the magneto-optical disk 36 in the above procedure. First, the CPU 32 reads sound data and image data out of the next address to the file header in the QuickTime file, and supplies the read sound data and compressed image data, together with a write request, to the memory control circuit 26. The sound data and the image data are written to the SDRAM 28 by the memory control circuit 26. Because the QuickTime file is formed as shown in FIG. 3, sound data in amount of ⅒th of a second and compressed image data in amount of 3 frames are alternately provided from this file. The sound data is written in order starting from a top of a sound area shown in FIG. 2, while the compressed image data is written in order starting from a top of a compressed image area 28b shown in same FIG. 2.

When a decompress command is supplied from the CPU 32 to the JPEG CODEC 30, the JPEG CODEC 30 requests the memory control circuit 26 to read out a frame of compressed image data, and decompresses by a JPEG scheme the compressed image data read from the compressed image area 28b by the memory control circuit 26. The JPEG CODEC 30 furthermore provides the decompressed image data, together with a write request, to the memory control circuit 26. The decompressed image data is written to a display image area 28a shown in FIG. 2 by the memory control circuit 26. The CPU 32 generates decompress commands at an interval of ⅒th of a second and the JPEG CODEC 30, in turn, decompresses the succeeding frames of compressed image data in the above procedure each time a decompress command is given. Consequently, the decompressed image data in the display image area 28a is updated at an interval of ⅒th of a second.

The decompressed image data stored in the display image area 28a is read out twice per time based upon the read request outputted at an interval of ⅟₆₀th of a second from the video encoder 38. The read out is made by the memory control circuit 26, and the video encoder 38 converts the decompressed image data thus read out into a composite image signal. The converted composite image signal is supplied to the monitor 40 with a result that a moving image having normal-speed moving is reproduced on the screen.

The CPU 32 also supplies a sound-data reproducing command to the signal processing circuit 48 in response to the system clock. The signal processing circuit 48, each time given a reproducing command, provides the memory control circuit 26 with a request to read sound data in amount of 1 byte and makes a predetermined reproducing process on the sound data read from the sound area 28c by the memory control circuit 26. The sound signal thus reproduce-processed is outputted through a speaker 52.

Incidentally, the SDRAM 28 operates as a ring buffer in both the record and reproduce modes. That is, the destination address is cyclically renewed in a ring form in each of the compressed image area 28b and the sound area 28c. Due to this, it is possible to record/reproduce compressed image data in amount exceeding the capacity of the compressed image area 28b and sound data in amount exceeding the capacity of the sound area 28c.

Figure 15:
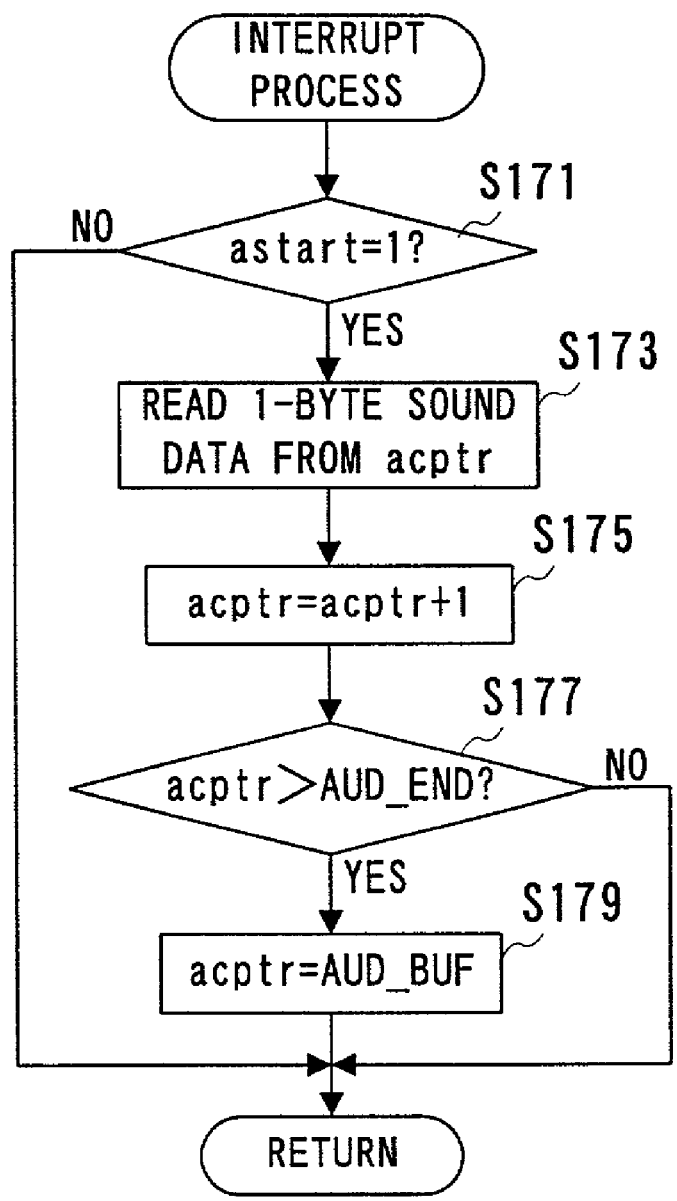
FIG. 15 is a flowchart showing still another part of operation of the FIG. 1 embodiment.
Figure 16:
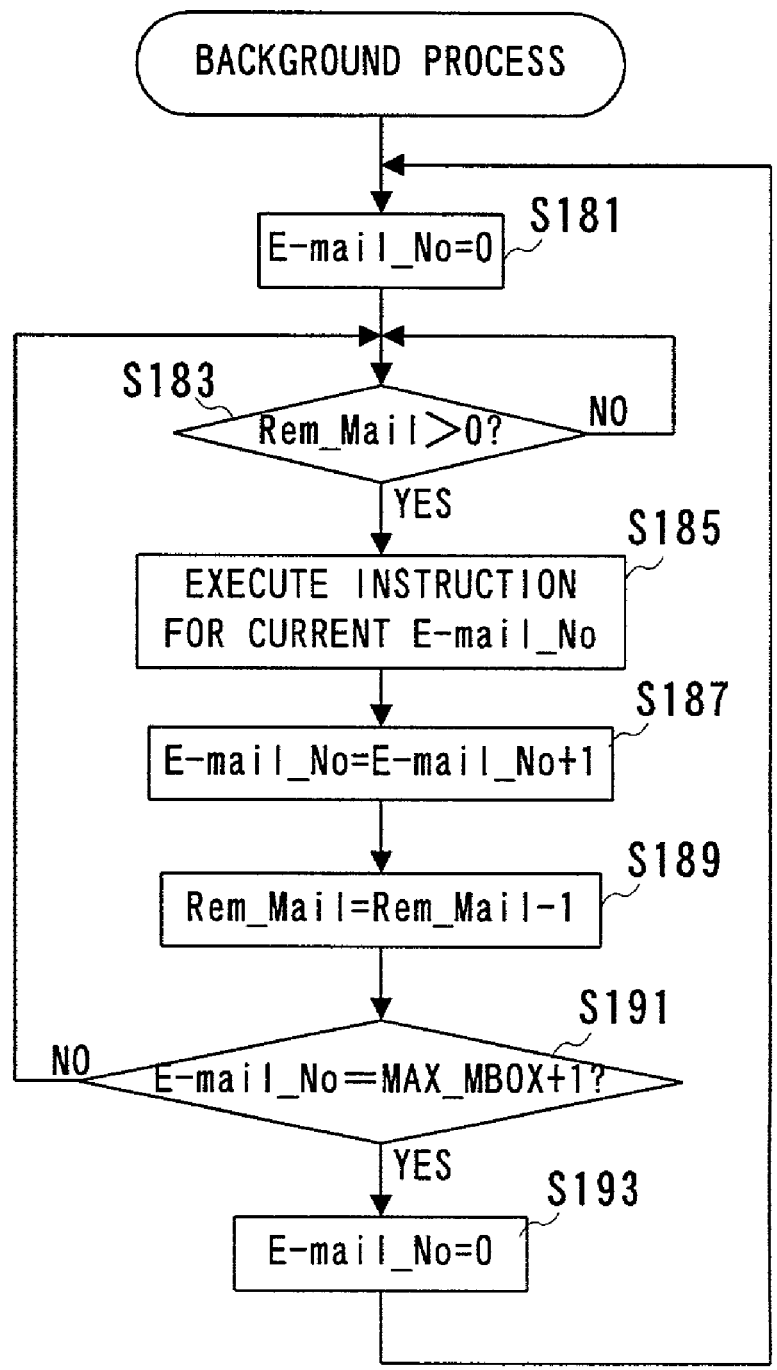
FIG. 16 is a flowchart showing yet another part of operation of the FIG. 1 embodiment.
Figure 17:
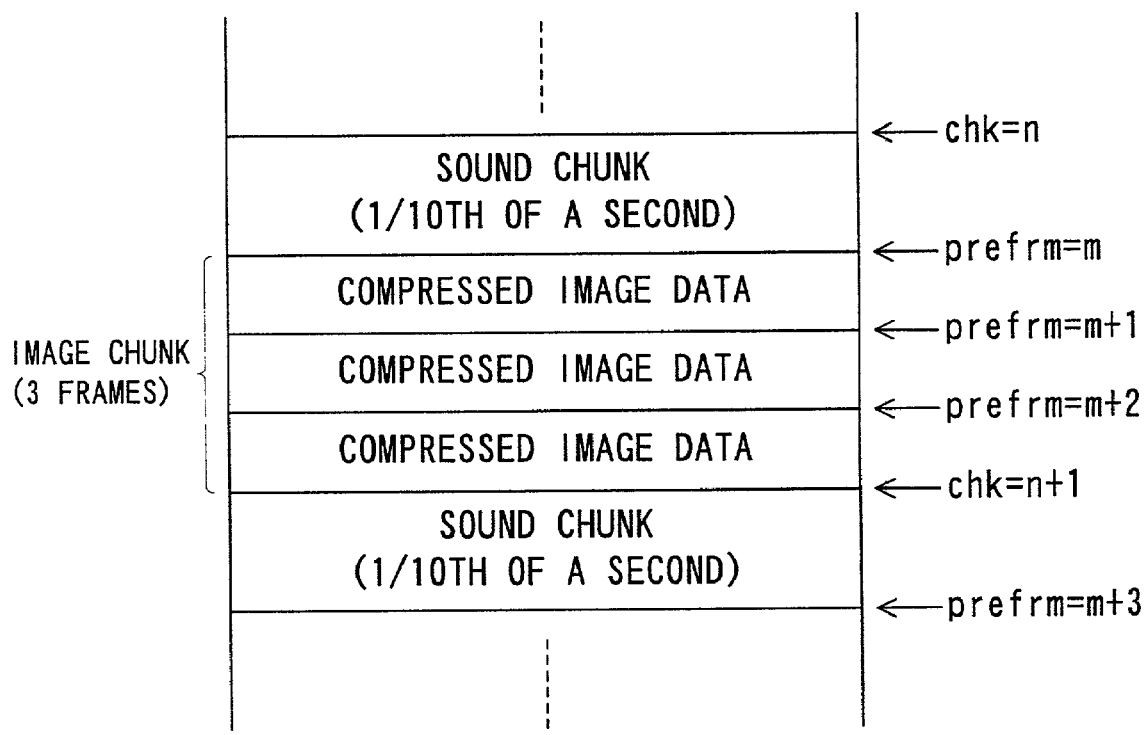
FIG. 17 is an illustrative view showing part of operation of the FIG. 1 embodiment.

When shifting the mode set switch toward "REPRODUCE" and the set key 56 is operated, the CPU carries out a reproduce process shown concretely in FIG. 7 to FIG. 16 and a background process shown in FIG. 17. The CPU 32 is installed with a multi-task OS (real-time OS), such as μiTRON, to concurrently execute a reproduce process and a background process.

Herein the process of the CPU 32 uses variables shown in Table 1 to Table 3. Table 1 lists variables related to sound, table 2 variables related to images and Table 3 variables related to background processes.

TABLE 1

| | |
|---|---|
| chk | CHUNK NO. |
| aofst[chk] | OFFSET |

TABLE 1-continued

| | |
|---|---|
| asz[chk] | CHUNK SIZE |
| acnt | SOUND-DATA COUNT VALUE |
| AMAX | SOUND-DATA TOTAL BYTES |
| AUD_BUF | SOUND-AREA HEAD ADDRESS |
| AUD_END | SOUND-DATA LAST ADDRESS |
| apreptr | SOUND WRITE ADDRESS |
| acptr | SOUND REPRODUCE ADDRESS |
| dm | REMAINING CAPACITY VALUE |
| astart | INTERRUPT PERMIT FLAG |
| aflg | SOUND-WRITE PROHIBIT FLAG |

TABLE 2

| | |
|---|---|
| prefrm | WRITE FRAME NO. |
| frm | REPRODUCE FRAME NO. |
| mofst[prefrm] | OFFSET |
| msz[prefrm] | FRAME SIZE |
| mcnt | FRAME COUNT VALUE |
| MFMAX | TOTAL NUMBER OF FRAMES OF IMAGE |
| MOV_BUF | COMPRESSED-IMAGE-AREA TOP ADDRESS |
| MOV_END | COMPRESSED-IMAGE-AREA LAST ADDRESS |
| mpreptr | IMAGE WRITE ADDRESS |
| mcptr | IMAGE REPRODUCE ADDRESS |
| decflg | IMAGE-DECOMPRESS PERMIT FLAG |

TABLE 3

| | |
|---|---|
| S-mail_No | SET MAIL NO. |
| E-mail_No | EXECUTE MAIL NO. |
| mail_min | MIN. MAIL NO. |
| mail_cnt | MAIL COUNT VALUE |
| MAX_MBOX | TOTAL NUMBER OF MAILS TO BE SET |
| Rem_Mail | NUMBER OF UNPROCESSED MAILS |

In Table 1, chk is a chunk no. of a sound chunk, aofst[chk] is offset of from a top address of the QuickTime file to a top of a sound chunk under consideration, and asz[chk] is a size (bytes) of a sound chunk under consideration. acnt is a count value of sound data as represented in bytes, and AMAX is total bytes of the sound data stored in the QuickTime file. AUD_BUF and AUD_END are respectively a top address and a last address of the sound area 28c. apreptr is a write address to the sound area 28c, acptr is a read (reproduce) address from the sound area 28c, and dm is a remaining capacity value of the sound area 28c. astart is a flag to represent whether to permit an interrupt process or not, and aflg is a flag to represent whether to prohibit from writing to the sound area 28c or not.

In Table 2, prefrm is a frame no. of compressed image data to be written to the compressed image area 28b, and frm is a frame no. of compressed image data to be read (reproduced) from the compressed image area 28b. mofst[prefrm] is offset of from a top address of the QuickTime file to a top address of compressed image data of a frame under consideration, and msz[prefrm] is a size of compressed image data of a frame under consideration. mcnt is a count value on the number of frames of compressed image data, and MFMAX is a total number of frames of the compressed image data stored in the QuickTime file. MOV_BUF and MOV_END are respectively a top address and a last address of the compressed image area 28b. mpreptr is a write address to the compressed image area 28b, and mcptr is a read (reproduce)

address from the compressed image area 28b. decflg is a flag to represent whether to permit a decompressed process on compressed image data.

In Table 3, S-mail_No is a mail no. representative of a write destination in setting a command to an instruction list 34c shown in FIG. 6, and E-mail_No is a mail no. showing a read destination in executing a command set in the instruction list 34c. mail_min is a minimum mail no., and mail_cnt is a mail-no. count value. MAX_BOX is a total number of mails (commands) to be set in the instruction list 34c, and Rem_Mail is the number of mails already set in the instruction list 34c but not yet processed.

Figure 7:
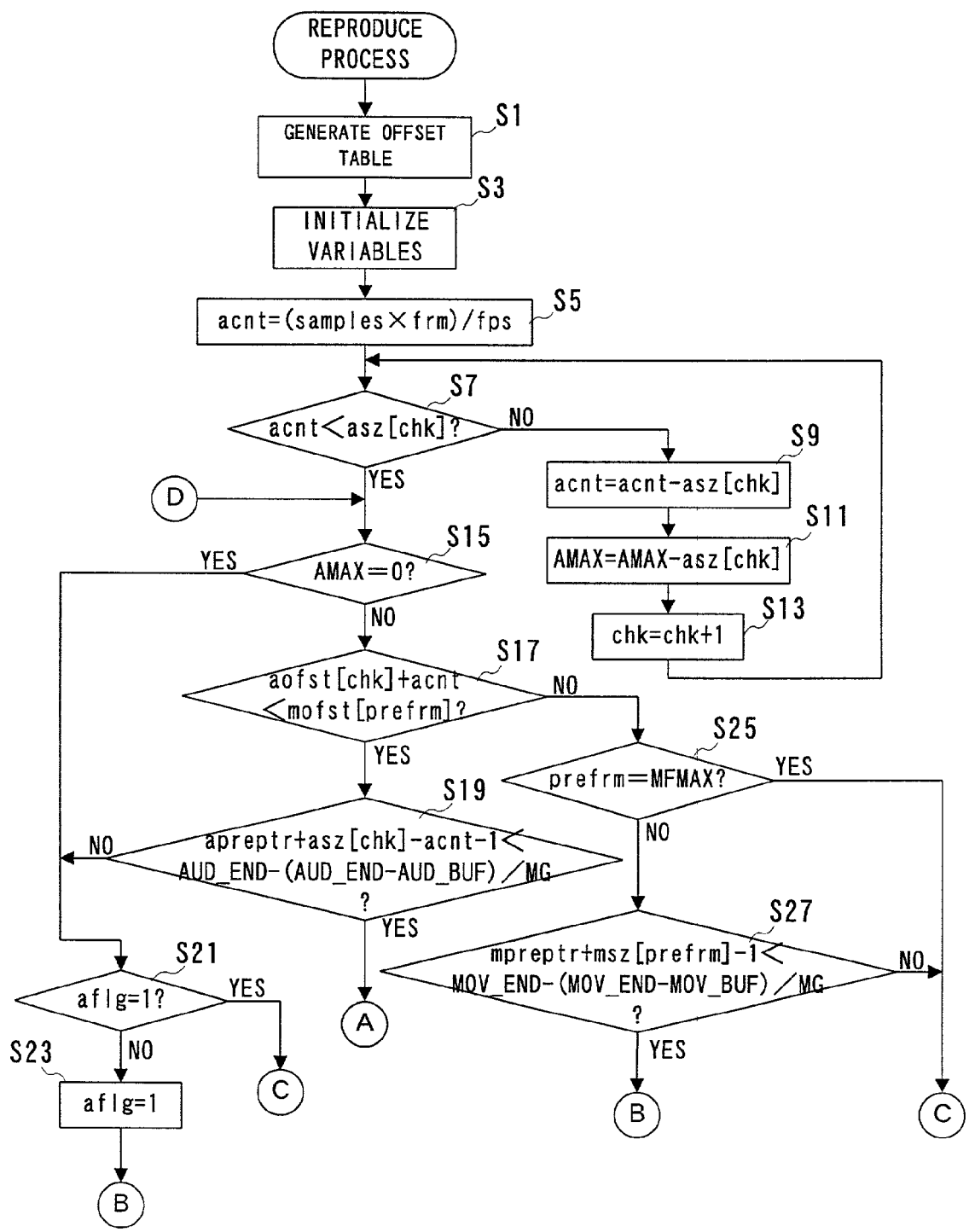
FIG. 7 is a flowchart showing part of operation of the FIG. 1 embodiment.
Figure 8:
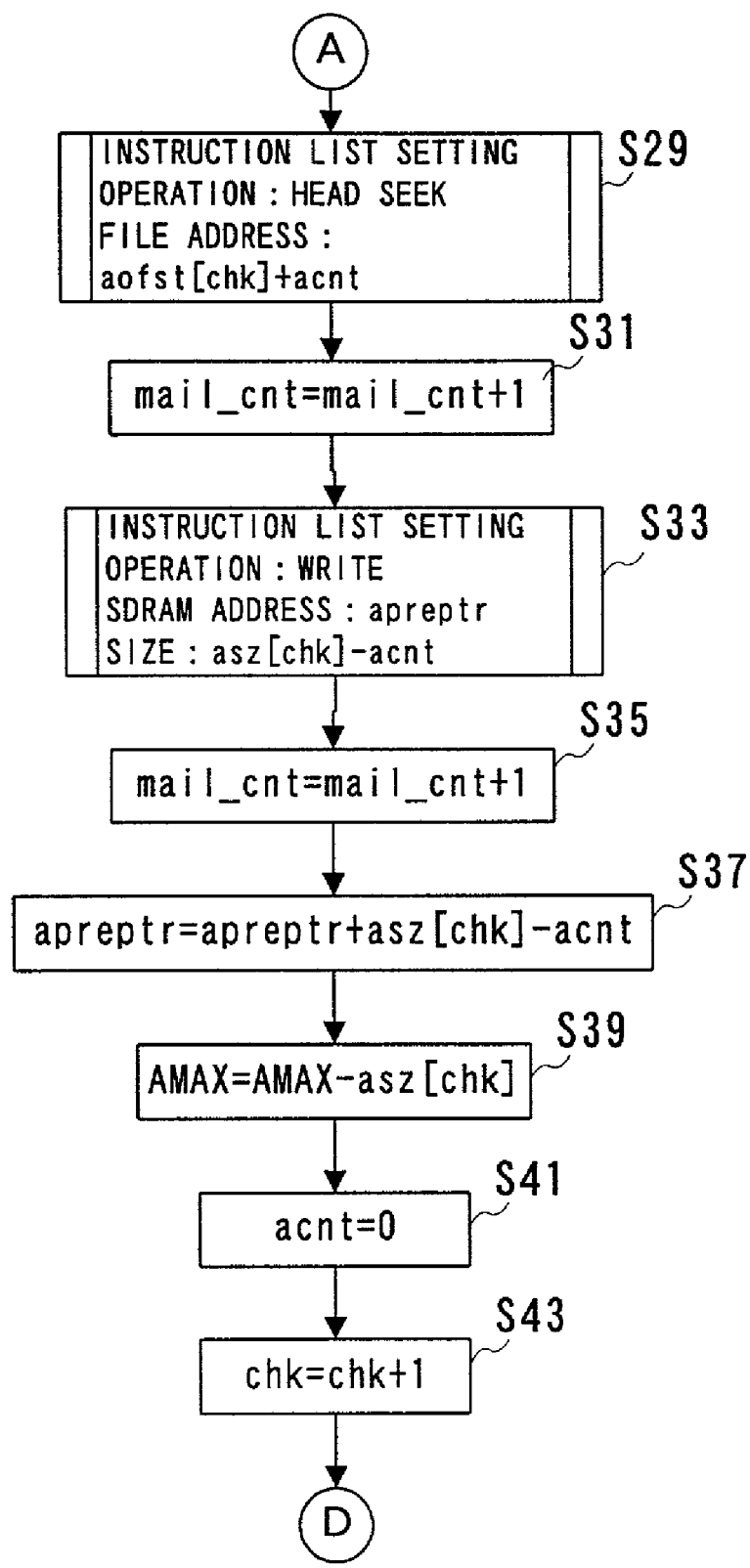
FIG. 8 is a flowchart showing another part of operation of the FIG. 1 embodiment.
Figure 9:
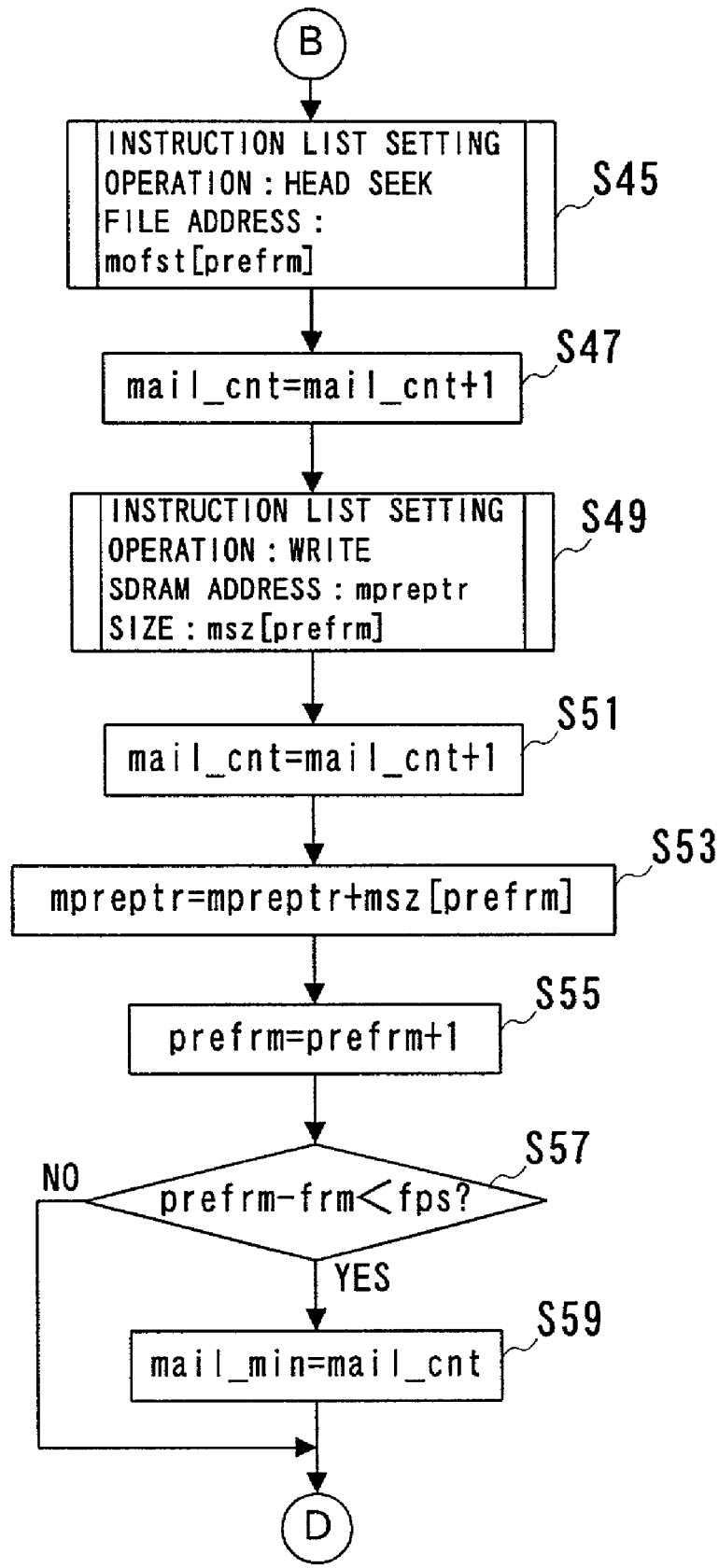
FIG. 9 is a flowchart showing still another part of operation of the FIG. 1 embodiment.

Referring to FIG. 7, in step S1 a sound offset table 32a shown in FIG. 4 and an image offset table 32b shown in FIG. 5 are produced on the basis of the address information written in the index chunk shown in FIG. 3. The sound offset table 32a is written with offsets aofst[chk] and chunk sizes asz[chk] of sound chunks. The image-offset table 32b is written with offsets mofst[prefrm] and data sizes msz[prefrm] of frames of compressed image data.

Next, in step S3 various variables are initialized. Specifically, for the sound data, the chunk no. chk is set at "0". The sound reproduce address acptr and sound write address apreptr is made coincident with a top address AUD_BUF of the sound area 28c. Then, the interrupt-permit flag astart and the sound-write prohibit flag aflg are set at "0". For the image data, the reproduce frame no. frm is made coincident with the write frame no. prefrm. The image reproduce address mcptr and image write address mpreptr is made coincident with a top address MOV_BUF of the compressed image area 28b. Then, the image decompress-permit flag decflg is set at "0". For the instruction list, the set mail no. S-mail_No, minimum mail no. mail_min and mail count value mail_cnt is set at "0".

In step S5, Equation 1 is operated to determine a sound-data count value acnt. In the succeeding step S7, the calculated count value acnt is compared with the size asz[chk] of the sound chunk corresponding to the current chunk no. chk. If acnt≧asz[chz], in step S9 the size asz[chk] of the current sound chunk is subtracted from the calculated count value acnt. In step S11, the size asz[chk] of the current sound chunk is subtracted from the total bytes AMAX of the sound data. Then, in step S13 the chunk no. chk is incremented. If the process of step S13 is ended, the process returns to the step S5.

$$acnt=(sample \times frm)/fps \quad (1)$$

sample: the amount of sound data corresponding to one frame (bytes)

fps: moving-image frame rate

By Equation 1, an address of sound data corresponding to still image in the frame (current frame) being displayed at present on the monitor 40. It is noted that the address to be determined herein is an address on the assumption that the sound data continues from the top and not necessarily agrees to an address on the QuickTime file shown in FIG. 3. Accordingly, the process of the steps S9 to S13 is repeated before determining acnt<asz[chk] in the step S7. This reveals in what numbered byte of what numbered sound chunk a desired address exists.

If acnt<asz[chk] is determined in the step S7, in step 15 a value of total bytes AMAX is determined. The step S15 is a process to determine whether all the sound-data transfer commands have been set to the instruction list 32a or not. If the count value acnt represents a last address of the last sound chunk, the total bytes AMAX will represent "0". At this time, it is considered that all the sound-data transfer commands have been set, and the process advances to step S21. In the step S21, determination is made on a state of the sound-write-prohibit flag aflg. If aflg=0, aflg=1 is given in step S23 and then process proceeds to step S45. If aflg=1, the process directly proceeds to step S61. That is, if the sound-write-prohibit flag aflg shows "0", then it is considered that all the sound-data transfer commands have been set but transfer command of compressed image data is not yet completed, and the process advances to step S45. At this time, because aflg=1 is provided in step S23, determination of "YES" is made in the step S21 process in the next time.

It is determined in step S17 whether Equation 2 stands or not. The step S17 is a process to determine whether the data to be set with the next transfer command is sound data or compressed image data.

$$aofst[chk]+acnt<mofst[prefrm] \quad (2)$$

As hereinafter described, when sound-data transfer command in amount of one chunk is set to the instruction list 32a or a compressed-image-data transfer command in amount of 3 frames is set to the instruction list 32a, inverted is the relationship in magnitude between "aofst[chk]+acnt" and "mofst[prefrm]". Due to this, it is determined whether the next transfer command is to be set for sound data or compressed image data depending upon whether Equation 2 stands or not. When setting is for sound data, "YES" is determined in step S17, and in step S19 whether Equation 3 stands or not.

$$apreptr+asz[chk]-acnt-1<AUD\_END-(AUD\_END-AUD\_BUF)/MG \quad (3)$$

MG: margin coefficient on sound area 28c

At the first write to the sound area 28c, a sound-margin area as shown in FIG. 2 is formed in the last end of the sound area 28c. (AUD_END−AUD_BUF)/MG represents a size of the sound margin area. On the other hand, the sound data of between an address represented by the current count value acnt and last address of the sound chunk to which that address belongs has size "asz[chk]−acnt". In step S19, it is determined whether the sound data corresponding to this "asz[chk]−acnt" can be stored in between a current sound write address apreptr and a sound-margin-area top address or not. Incidentally, "−1" in Equation 3 is due to consideration that the sound area 28c in address begins at "0".

If "NO" herein, all the sound data has not been completed in transfer command setting. However, it is considered that the transfer command cannot be set because of insufficient capacity of the sound area 28c, and process advances to step S21. On the other hand, if "YES" is determined in step S19, it is considered that the capacity of the sound area 28c is sufficient, and the process proceeds to step S29.

In the step S29, an operation "HEAD SEEK" and a file address "aofst[chk]+acnt" are set to the instruction list 32a shown in FIG. 6. In the succeeding step S31, the mail count value mail_cnt is incremented. Furthermore, in step S33 an operation "WRITE", an SDRAM address "apreptr" and a size "asz[chk]−acnt" are set to the instruction list 32a. In step S35, the mail count value mail_cnt is again incremented.

Because setting of sound-data write corresponding to "asz[chk]−acnt" has been completed, in the step S33 in step S37 "asz[chk]−acnt" is added to the current sound write address apreptr. In step S39, the size of the current sound chunk "asz[chk]" is subtracted from the total bytes AMAX. Thereafter, in step S41 the count value acnt is rendered "0", and in step S43 the chunk no. chk is incremented and then the process returns to the step S15.

Incidentally, the count value acnt is a variable used to specify an access-destination address upon starting reproducing at a midway of a certain sound chunk. Due to this, transfer setting of the sound data belonging to this count chunk has been completed, the count value acnt becomes "0" and is meaningless.

Figure 14:
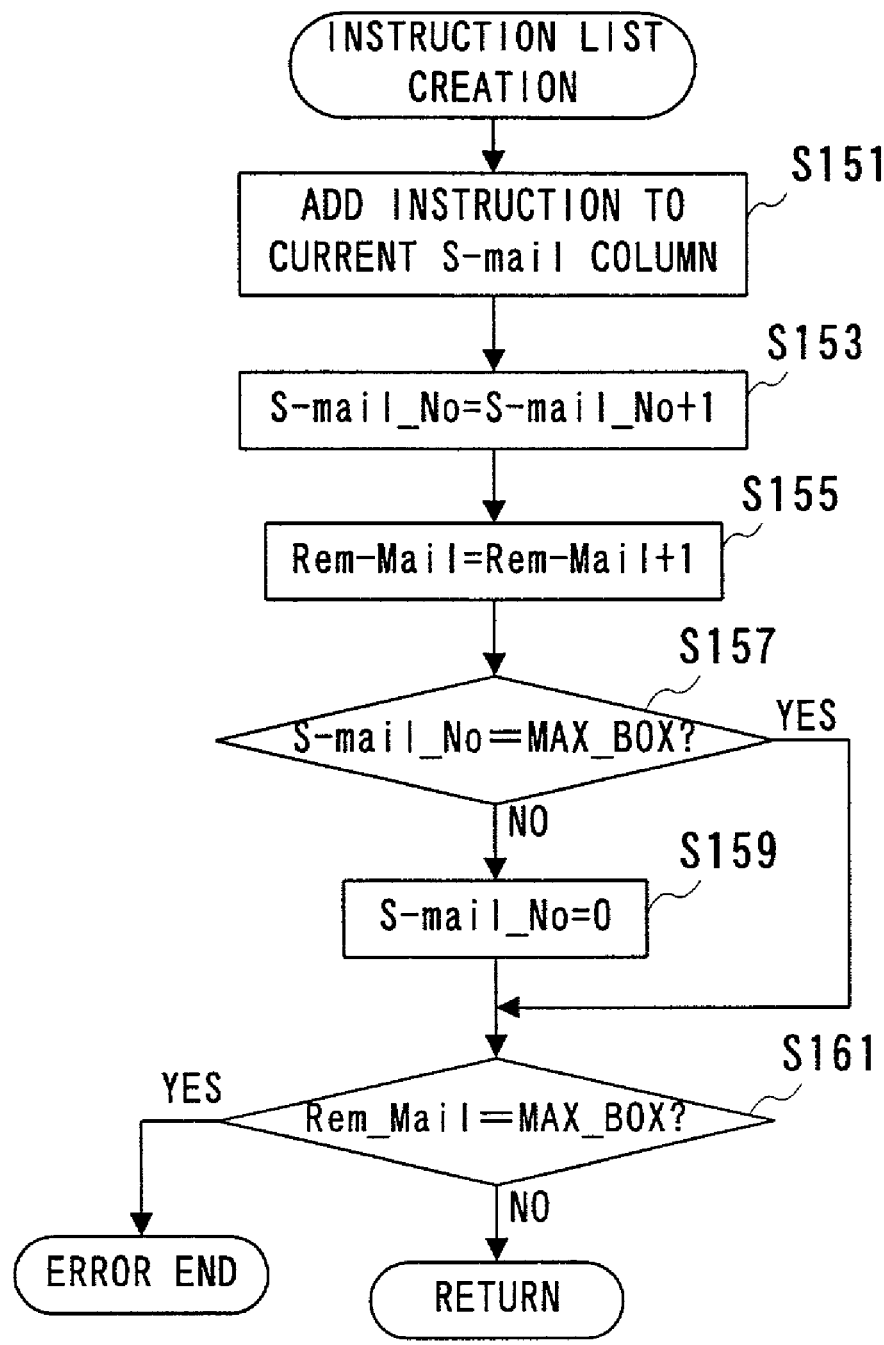
FIG. 14 is a flowchart showing another part of operation of the FIG. 1 embodiment.

In the above steps S29 and S33 as well as the hereinafter-described steps S45, S49, S105, S109, S112, S115, S127 and S129, a subroutine shown in FIG. 14 is processed. First, in step S151 a desired command (instruction) is added to a column of a currently set mail no. S-mail_No. Next, in step S153 the set mail no. S-mail_No is incremented, and in step S155 the number of unprocessed mails Rem_Mail is incremented. In step S157, the incremented set-mail no. S-mail_No is compared with the number of settable mails MAX_BOX. If S-mail_No<MAX_BOX herein, the process directly proceeds to step S161. However, if S-mail_No=MAX_BOX, in step S159 the set-mail no. S-mail_No is returned to "0" and then the process advances to step S161. It is determined in the step S161 whether the number of unprocessed mails Rem_Mail is equal to the total number of mails MAX_BOX or not. If "NO", the process directly returns. However, if "YES", it is considered that an error occurred, and the process is forcibly ended.

In step S15 shown in FIG. 7, when the total bytes AMAX become "0" due to the renewal process of the step S39, the process proceeds to step S21 through the determination process of "YES". On the other hand, if the total bytes AMAX have not decreased down to "0", the process advances to step S25 through the determination process of "NO" in step S17. That is, because Equation 2 becomes not standing due to the renewal of chunk no. chk in the step S43, the process proceeds to step S25. In the step S25, the frame no. prefrm of the compressed image data to be written to the compressed image area 28b is compared with the total frames MFMAX. If prefrm=MFMAX, the process proceeds to step S61 while, if prefrm<MFMAX, it is determined in step S27 whether Equation 4 stands or not.

$$\text{mpreptr+msz[prefrm]}-1<\text{MOV\_END\_(MOV\_END}-\text{MOV\_BUF)/MG} \quad (4)$$

Similarly to the above sound area, at a first write of compressed image data to the SDRAM 28, an image margin area shown in FIG. 2 is formed at the last of the compressed image area 28b. (MOV_END−MOV_BUF)/MG in Equation 4 represents a size of the image margin area. The step S27 determines as to whether the compressed image data in amount of a frame corresponding to "msz[prefrm]" can be stored between a current image write address mpreptr and a top address of the image margin area or not.

If Equation 4 is not fulfilled, the process proceeds to step S61 similarly to the determination of prefrm=MFMAX. On the other hand, if Equation 4 is fulfilled, the process proceeds to step S45 to set an operation "HEAD SEEK" and file address "mofst[prefrm]" to the instruction list 32a. Subsequently, in step S47 the mail count value mail_cnt is incremented. In step S49, an operation "WRITE", SDRAM address "mpreptr" and size "msz[prefrm]" is set to a column of the instruction list 32a corresponding to the current mail count value. Completing the set process, in step S51 the mail count value mail_cnt is again incremented.

In step S53, "msz[prefrm]" is added to the current image write address mpreptr. In the succeeding step S55, the current write frame no. prefrm is incremented. Thereafter, it is determined in step S57 whether Equation 5 stands or not. If "NO", the process directly returns to the step S15. However, if "YES", a minimum mail no. mail_min is made coincident with the mail count value mail_cnt and then the process returns to the step S15.

$$\text{prefrm−frm}<\text{fps} \quad (5)$$

Equation 5 stands when the difference between the write frame no. prefrm and a reproduce frame no. (frame no. of a displayed still image) frm is below "30" of the frame rate. Due to this, as long as the compressed image data completed in setting to the instruction list 32a but not yet reproduce-processed (decompress on process) in frame no. is below "30", the minimum mail no. mail_min is incremented following the mail count value mail_cnt. However, if the setting process to the instruction list 32a is executed at high speed and the above difference becomes greater than "30", the minimum mail no. mail_min is suspended from being incremented.

Referring to FIG. 17, the chunk no. chk is incremented each time a transfer command of sound data in amount of one chunk is set to the instruction list 32a. On the other hand, the write frame no. prefrm is incremented each time a transfer command of compressed image data in amount of one frame is set to the instruction list 32a. Consequently, the top address of the sound chunk under consideration and the top address of the frame under consideration are inverted in positional relationship each time completing the transfer setting of sound data in amount of one chunk, or each time completing the transfer setting of compressed image data in amount of three frames. Accordingly, alternately set in the instruction list 32a are a transfer command of sound data in amount of one chunk and a transfer command of compressed image data in amount of three frames in the order the address of the QuickTime file increases.

Figure 10:
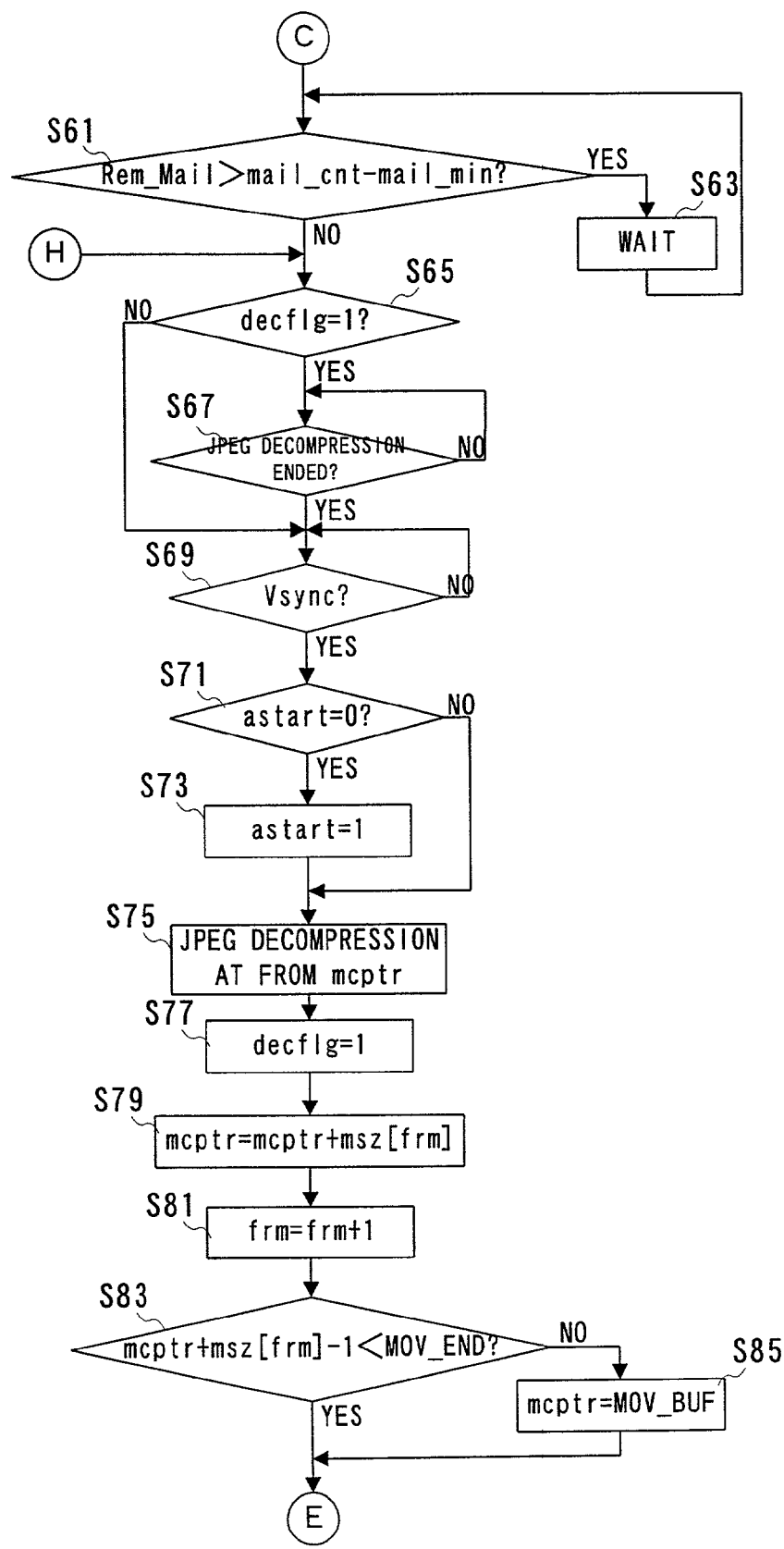
FIG. 10 is a flowchart showing yet another part of operation of the FIG. 1 embodiment.
Figure 11:
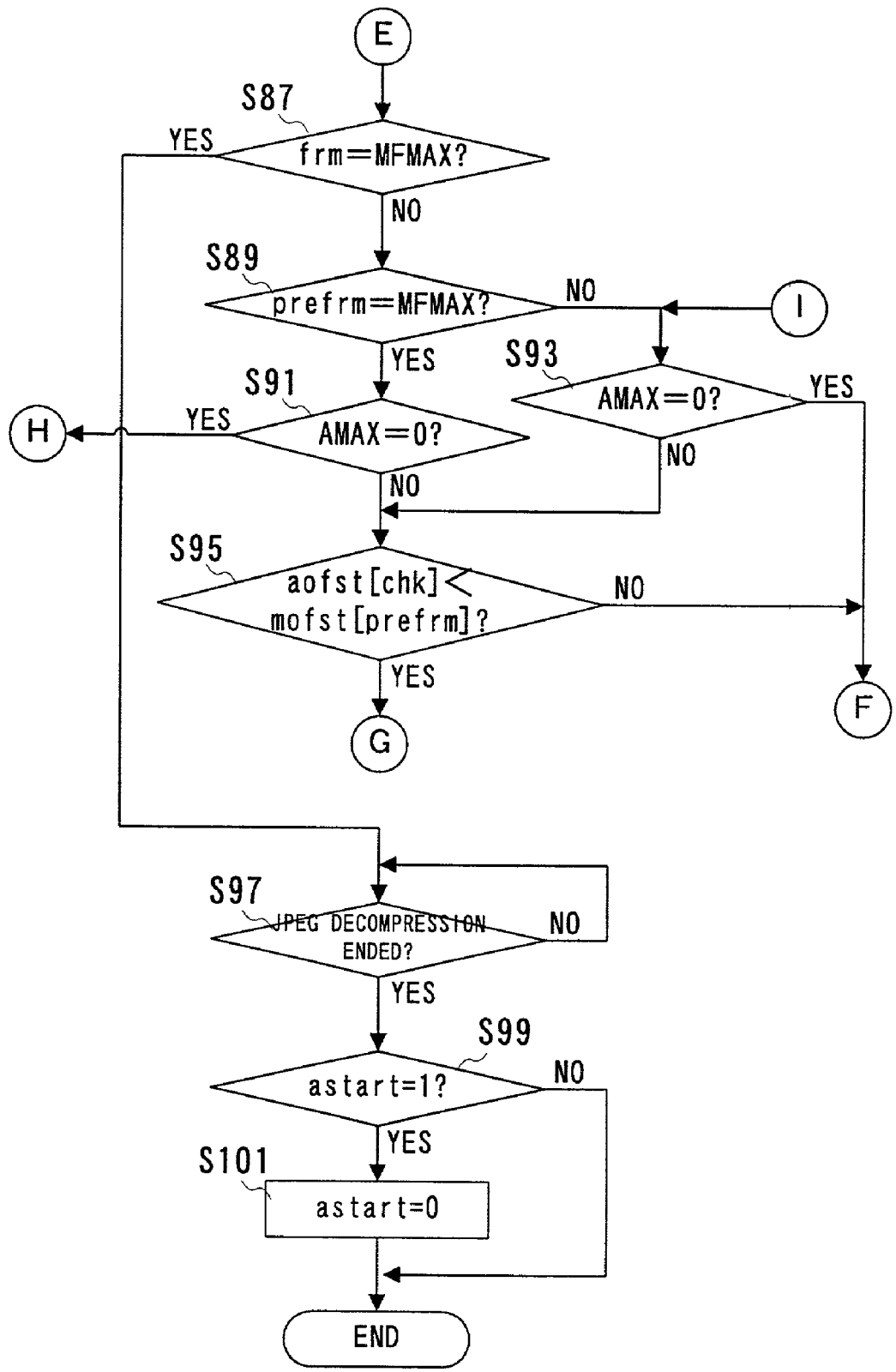
FIG. 11 is a flowchart showing another part of operation of the FIG. 1 embodiment.

In step S61 shown in FIG. 10, it is determined whether Equation 6 stands or not. When moving to the step S61, both the mail count value mail_cnt and the minimum mail no. mail_min take fixed values. On the other hand, the number of unprocessed mail Rem_Mail is decremented each time the transfer command is executed by a background process, hereinafter described.

$$\text{Rem\_Mai}>\text{mail\_cnt−mail} \quad (6)$$

Equation 6 stands when the number of unprocessed mail Rem_Mail, i.e. the number of commands already set in the instruction list 32a but not yet executed, is excessive in the number. In such a time, the process waits for a predetermined period in step S63 and thereafter processes again the step S61. Due to the waiting in the step S63, the CPU 32 devotes itself to the background process and hence the number of unprocessed mails Rem_Mail swiftly decreases. When Equation 6 becomes not satisfied due to this, the process advances to step S65.

As discussed above, the mail count value mail_cnt and minimum mail no. mail_min is fixed when the process moves to the step S61. Thus "mail_cnt−mail_min" represents a certain fixed value. Herein, non-coincidence will occur between the mail count value mail_cnt and the minimum mail no. mail_min when the difference between the write frame no. prefrm and the reproduce frame no. frm exceeds the frame rate. The difference between the both increases from then on each time a transfer command is set. Where the QuickTime file is sufficiently great in size as compared to the capacity of the SDRAM 28, the difference value is fixed when Equation 3 or Equation 4 becomes not fulfilled. Thus, the difference value, i.e. value of "mail_cnt−mail_min", is regulated by the frame rate and the capacity of SDRAM 28. More specifically, the greater the value represented by "mail_cnt−mail_min" the slower the frame rate becomes.

In step S65, determination is made on a state of an image-decompress permit flag decflg. If decflg=0, the process directly advances to step S69. If decflg=1, it is determined in step S67 that the JPEG decompression process in amount of one frame has been completed, and the process proceeds to step S69. In the step S69, determination is made for an input of a vertical synchronizing signal occurring at an interval of ⅓₀th of a second. In response to a determination result of the presence of an input, the process proceeds to step S71. In step S71, determination is made on a state of an interrupt permit flag astart related to the sound data process. If astart=1, the process directly proceeds to step S75 while, if astart=0, in step S73 astart is set at "1" and then the process advances to step S75.

In the step S75, the JPEG CODEC 30 is instructed to decompress the compressed image data in amount of one frame written in the compressed image area 28b in a position following the image reproduce address mcptr. The JPEG CODEC 30 performs a decompression process in the above manner. As a result, the corresponding still image is displayed on the monitor 40. In step S77, the image-decompress permit flag decflg is set to "1" in order to make a determination "YES" in step S65 in the next time. Subsequently, in step S79 the image reproduce address mcptr is updated, i.e. the size of the compressed image data thus decompression-processed msz[frm] is added to the current image reproduce address mcptr. In step S81 the reproduce frame no. is incremented, and it is determined in step S83 whether Equation 7 is fulfilled or not.

$$\text{mcptr} + \text{msz[frm]} - 1 < \text{MOV\_END} \tag{7}$$

When Equation 7 is fulfilled, the compressed image data of the next frame is stored in a position following the updated image reproduce address mcptr. On the other hand, when Equation 7 is not fulfilled, the compressed image data of the next frame is stored in a position following the top address MOV_BUF of the compressed image area. Consequently, if "YES" in the step S83, the process directly proceeds to step S87. However, if "NO", a top address MOV_BUF is set in the image reproduce address mcptr in step S85 and then the process advances to step S87.

The reproduce process of sound data is incremented according to an interrupt routine shown in FIG. 15. The interrupt process is started in response to a clock of 7990 Hz (sound-sampling frequency). First, it is determined in step S71 whether the interrupt permit flag astart is "1" or not. If herein astart=0, the process directly returns to the main routine. However, if astart=1, in step S173 a sound reproduce command is delivered to the signal processing circuit 48. In response to the sound reproducing command, the signal processing circuit 48 provides read request to the memory control circuit 26 and reads sound data in amount of 1 byte out of the sound reproduce address acptr of the sound area 28c. A predetermined process is made on the read-out sound data, and the processed sound signal is outputted through the speaker 52. In step S175, the sound reproduce address acptr is incremented. In step S177, the sound reproduce address acptr after update is compared to the last address AUD_END of the sound area 28c. If herein acptr≦AUD_END, it is considered that the sound data in the next byte has been written in the updated sound reproduce address acptr, and the process directly returns to the main routine. On the contrary, if acptr>AUD_END, it is considered that the next byte of sound data has been written in the top address AUD_BUF of the sound area 28c. In step S179, a top address AUD_BUF is set to the sound reproduce address acptr, and then the process returns to the main routine.

Referring back to FIG. 11, in step S87 the current frame no. frm is compared with the total number of frames MFMAX. If frm=MFMAX, it is considered that there is no compressed image data in the next frame, and the process advances to step S99 by waiting for the determination in step S97 that the current frame of compressed image data has been completed in decompression process. In the step S99, determination is made on a state of the interrupt permit flag astart. If astart=0, the process is ended as it is. However, if astart=1, in step S101 this interrupt permit flag astart is returned to "0" and thereafter the process is ended.

If determined "NO" in the step S87, in step S89 the write frame no. prefrm is compared with the total number of frames MFMAX. If prefrm=MFMAX, it is determined in step S91 whether the total bytes AMAX is "0" or not. On the other hand, if prefrm<MFMAX, it is determined in step S93 whether the total bytes AMAX is "0" or not. If prefrm=MFMAX and MAX=0, then it is considered that transfer command setting has been completed for all the compressed image data and sound data, and the process returns from the step S91 to the step S65. If prefrm=MFMAX but AMAX>0 or otherwise prefrm<MFMAX and AMAX>0, it is considered that the data to be set with a transfer command is left, and the process advances from the step S91 or S93 to the step S95. Then, the current sound-chunk offset aofst[chk] is compare with a compressed-image-data offset mofst[prefrm] corresponding to the current write frame no. prefrm. Depending on a comparison result, the process proceeds to step S103 or S123. If prefrm<MFMAX but AMAX=0, it is considered that the data to be set with a transfer command is only the compressed image data, and the process advances from the step S93 to step S123.

In the step S103, it is determined whether Equation 8 is fulfilled or not.

$$\text{apreptr} + \text{asz[chk]} - 1 < \text{AUD\_END} \tag{8}$$

When Equation 8 stands, there is a vacant capacity capable writing all the sound data of the current sound chunk in the position following the current write address apreptr. In this case, in step S111 "0" is set to a remaining capacity value dm, and in step S112 an operation "HEAD SEEK" and file address "aofst[chk]" is set to the instruction list 32a, and then the process proceeds to step S113. On the contrary, if Equation 8 does not stand, the sound data of the current sound chunk, except for one part thereof, cannot be written to the position following the current sound write address apreptr. In this case, in step S105 an operation "HEAD SEEK" and file address "aofst[chk]" is set to the instruction list 32a. In step S107, a remaining capacity value dm is determined according to Equation 9, and in step S109 an operation "WRITE", size "dm" and SDRAM address "apreptr" is set to the instruction list 32a. Completing the process of the step S109, the process advances to step S113.

$$dm = (\text{AUD\_END} - \text{apreptr} + 1) \tag{9}$$

In step S113, the top address "AUD_BUF" of the sound area 28c is set to the sound write address apretr. In the succeeding step S115, an operation "WRITE", SDRAM address "apreptr" and size "asz[chk]−dm" is set to the instruction list 32a. In step S117, the sound write address apreptr is updated according to Equation 10.

$$\text{apreptr} = \text{apreptr} + asz[chk] - dm \tag{10}$$

Thereafter, in step S119 the current sound-chunk size asz[chk] is subtracted from the total bytes AMAX, and in step S121 the chunk no. chk is incremented and the process returns to the step S93.

In this manner, if there is a vacant capacity capable of writing sound data in amount of one chunk in position following the sound write address apreptr, then in step S115 a command for transferring sound data in amount of one chunk is set to the instruction list 32a. On the other hand, if there is no vacant capacity capable of writing sound data in amount of one chunk in position following the sound write address apreptr, in step S109 a command for transferring part of the sound data is set to the instruction list 32a, and in step S115 a command for transferring the remaining sound data is set to the instruction list 32a. After returning from the step S121 to the step S93, the process moves to step S123 directly or through the step S95.

In the step S123, it is determined whether Equation 11 is fulfilled or not.

$$mpreptr + msz[prefrm] - 1 < MOV\_END \qquad (11)$$

If Equation 11 is fulfilled, it is considered that the compressed image data in amount of one frame can be written to the position following the current image write address mpreptr, and the process directly advances to step S127. If Equation 11 is not fulfilled, the top address MOV_BUF is set to the image write address mpreptr in order to write compressed image data in amount of one frame to a position following the top address MOV_BUF. Ending the process of the step S125, the process proceeds to step S127. In step S127, an operation "HEAD SEEK" and file address "mofset[prefrm]" is set to the instruction list 32a. In the succeeding step S129, an operation "WRITE", SDRAM address "mpreptr" and size "msz[prefrm]" is set to the instruction list 32a. Thereafter, in step S131 the size msz[prefrm] is added to the current image write address mpreptr, and in step S133 the write frame no. prefrm is incremented.

In step S135, it is determined whether Equation 12 is fulfilled or not. Equation 12 is the same as above-mentioned Equation 6.

$$Rem\_Mail > mail\_cnt - mail\_min \qquad (12)$$

When Equation 12 is not fulfilled, the number of unprocessed mails is not so much and accordingly the process returns to the step S65 without passing the steps S137-S141. On the other hand, when Equation 12 is fulfilled, in step S137 the interrupt permit flag astart is set to "0" to interrupt the reproducing of sound data in order for devotion to the background process. In step S139 a predetermined time is waited for. Elapsing the predetermined time, the process proceeds to step S141 to determine whether Equation 13 is fulfilled or not, i.e. whether the number of unprocessed mails is reduced to a half or not.

$$Rem\_Mail > (mail\_cnt - mail\_min)/2 \qquad (13)$$

If Equation 13 does not stand, the process of the steps S139 and S141 is repeated, wherein the process returns to the step S65 when Equation 13 is fulfilled.

By returning to the step S65, the process of decompressing the compressed image data is again executed. Also, when the process of reproducing sound data is interrupted in order for devotion to the background process, the sound reproducing process is resumed by the process of the step S73.

Figure 12:
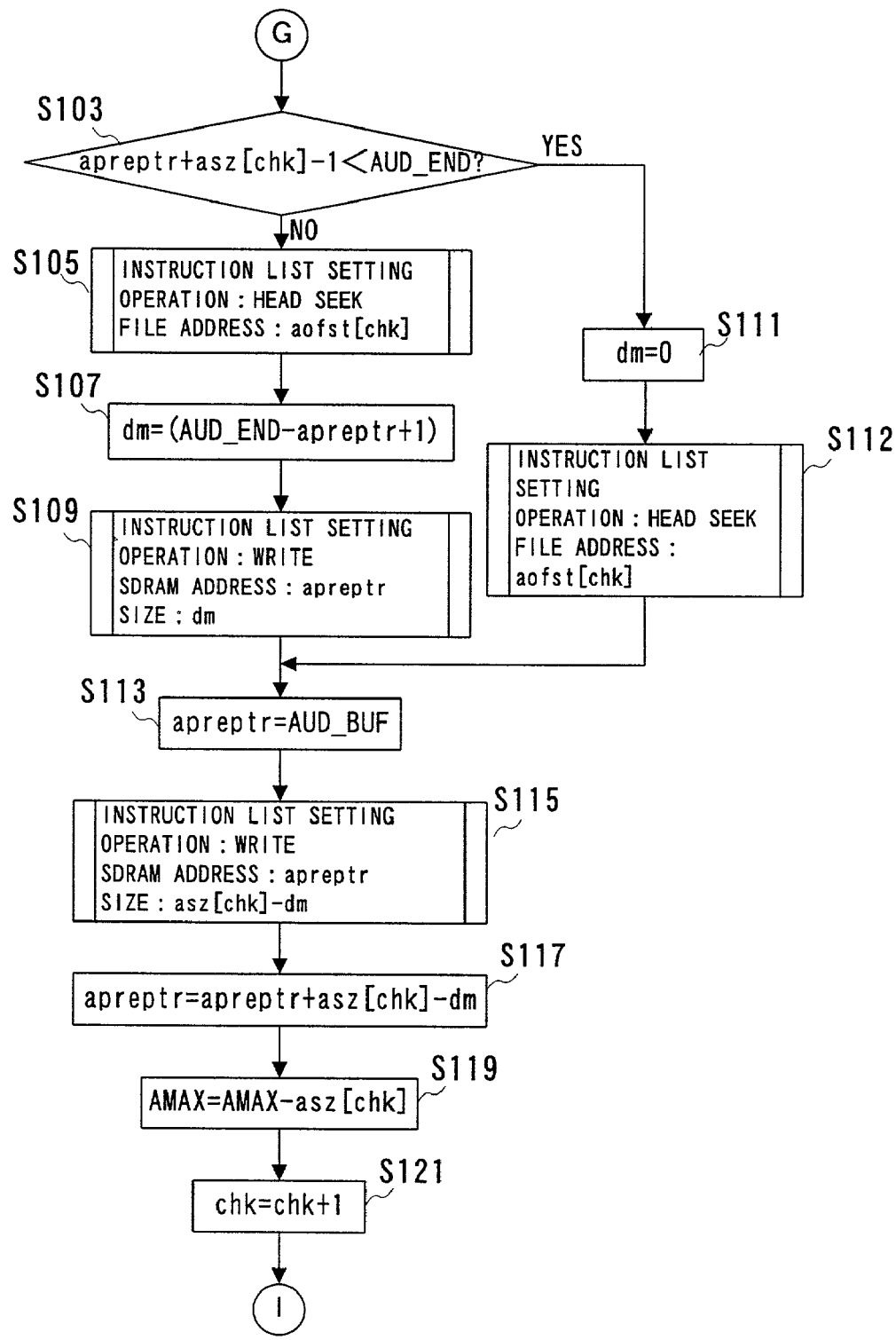
FIG. 12 is a flowchart showing still another part of operation of the FIG. 1 embodiment.
Figure 13:
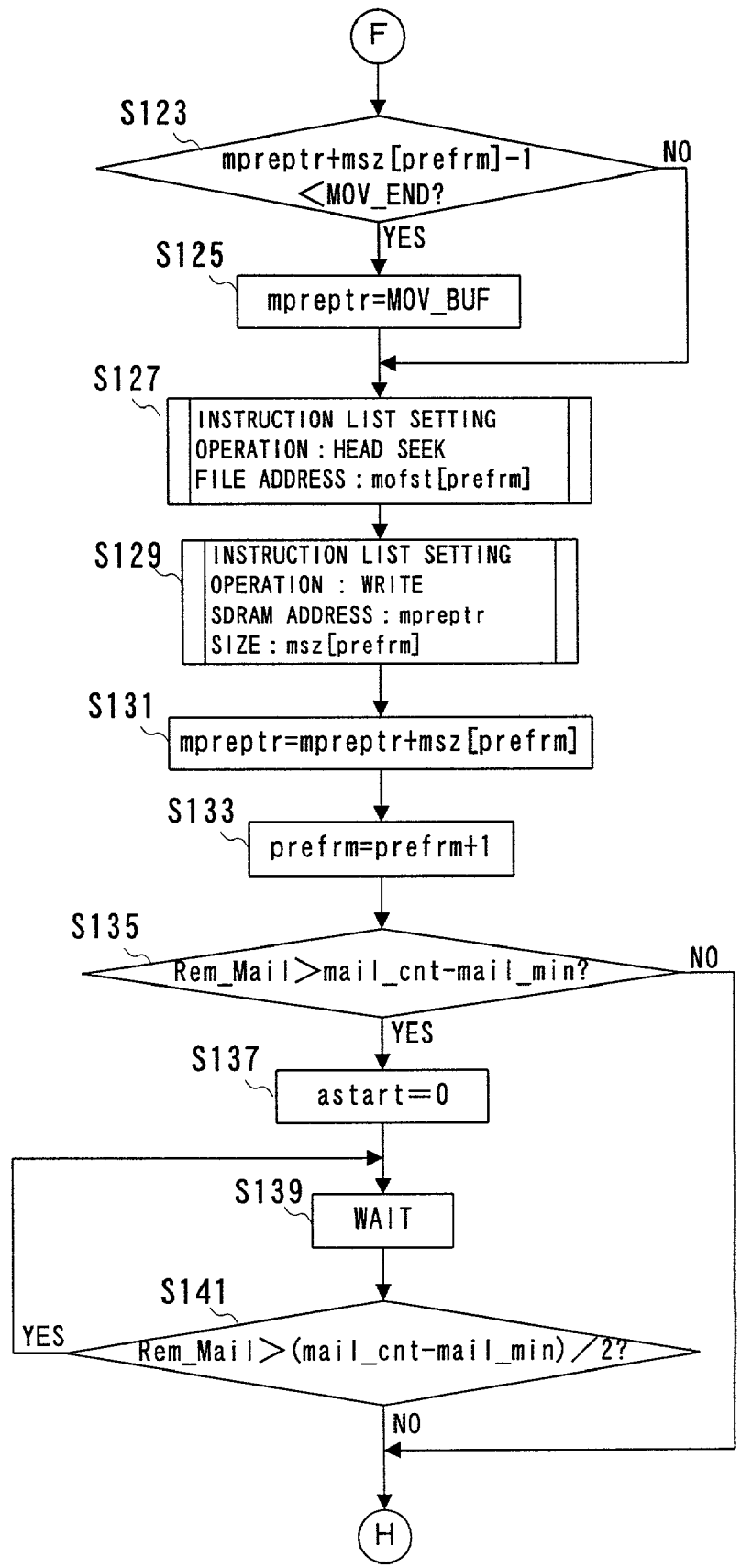
FIG. 13 is a flowchart showing yet another part of operation of the FIG. 1 embodiment.

In this manner, the transfer setting of sound data in amount of one chunk in the steps S112 and S115 or S105, S109 and S115 of FIG. 12 as well as the transfer setting of compressed image data in amount of one frame in steps S127 and S129 of FIG. 13 are made each time completing the process of decompressing compressed image data in amount of one frame. On the other hand, sound data is reproduced byte by byte in response to the clock of 7990 Hz as long as interrupt permit flag astart represents "1". Accordingly, there is no possibility that the transfer command to be newly set to the instruction list 32a be overwritten by an unprocessed transfer command.

The background process is executed according to a flowchart shown in FIG. 16. First, in step S181 an execution mail no. E-mail_No is set at "0". Next, it is determined in step S183 whether the number of unprocessed mails Rem_Mail is greater than "0" or not. If "NO" herein, the process of step S183 is repeated, wherein the process advances to step S185 when Rem_Mail>0 is reached. In step S185, an instruction for the currently executed mail no. E-mail_No is executed. That is, if the instruction content is "HEAD SEEK", a seek is made to a desired file address on the magneto-optical disk 36. If the instruction content is "WRITE", desired data is transferred from the magneto-optical disk 36 to the SDRAM 28. When the instruction is executed, in step S187 the execution mail no. E-mail_No is incremented, and in step S189 the number of unprocessed mails Rem_Mail is decremented. In step S191, it is determined whether the execution mail no. E-mail_No exceeded the maximum mail no. (MAX_BOX+1) or not. If "NO", the process directly returns to the step S183 while, if "YES", the process returns to the step S181.

As can be understood from the above explanation, if the reproduce mode is selected and the set key 56 is pressed, the CPU 32 concurrently makes a transfer process of compressed image data and sound data from the magneto-optical disk 36 to the SDRAM 28 and a reproducing process of the compressed image data and sound data stored in the SDRAM 28.

Herein, the reproduce process includes a process of setting the transfer command of compressed image data and sound data (including seek and write operations) to the instruction list 32a and a process of outputting the compressed image data and sound data stored in the SDRAM 28. On the other hand, the transfer process includes a process of making reference to the instruction list 32a and seeking desired address on the magneto-optical disk 36 and a process of making reference to the instruction list 32a and writing desired data to a desired address of the SDRAM 28.

In the case that data is sporadically recorded over the disk recording medium such as the magneto-optical disk 36, there is a case that the reading from the disk recording medium is delayed due to the cause of head seek. In such a case, where serially transferring data from the magneto-optical disk 36 to the SDRAM 28 or outputting the data stored in the SDRAM 28, there is a fear of partial delay in outputting the data. This possibly results in partial freeze in the output moving image when the reproduced data is moving image data, or partial break in the output sound when the reproduced data is sound data.

Contrary to this, in this embodiment the CPU 32 is mounted with a real-time OS to concurrently execute the process of transferring data from the magneto-optical disk 36 to the SDRAM 28 and the process of reproducing the data stored in the SDRAM. This can prevent against partial freeze in the reproduced moving image or partial break in the reproduced sound.

Also, the reproduce process includes a process of setting a plurality of operation commands to the instruction list 32a and a process of decompressing and outputting the compressed image data stored in the SDRAM 28. On the other hand, the transfer process includes a process of making reference to the instruction list 32*a* and seeking a desired address on the magneto-optical disk 32*a* and a process of making reference to the instruction list 32*a* and transferring data, frame by frame, from the magneto-optical disk 36 to the SDRAM 28.

That is, a plurality of operation commands are set to the instruction list 32*a* by part of the reproduce process. In the transfer process concurrent with the reproduce process, a desired address on the magneto-optical disk 36 is sought by making reference to the instruction list 32*a*. By reference to the same instruction list 32*a*, the compressed image data is transferred, frame by frame, to the SDRAM 28. The compressed image data stored to the SDRAM 28 is outputted through a decompression process. In this manner, a plurality of operation commands are accumulated in the instruction list 32*a*, wherein the operation to be next executed is fixed in the instruction list 32*a*. Accordingly, even when partial delay occurs due to seek operation, the operation command can be promptly processed after completing the seek operation.

Incidentally, although this embodiment uses the magneto-optical disk as a disk recording medium, a hard disk may be used in place of the magneto-optical disk. Also, although this embodiment uses a file in the QuickTime type, an AVI (Audio Video Interleave) type file may be used instead thereof. Furthermore, although the moving image of this embodiment has a frame rate of 30 fps, the frame rate is not limited to this. Also, although this embodiment the Quicktime file recorded on the magneto-optical disk is managed by the FAT scheme, the file management scheme may be buy an UDF (Universal Disk Format) scheme. Furthermore, although this embodiment uses the CCD type image sensor, a CMOS-type image sensor may be used in place thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A moving image reproducing apparatus which produces moving image content from a recording medium, comprising:

an internal memory for temporarily storing the moving image content; and a processor for carrying out in parallel a plurality of tasks under a control of a multi-task OS, wherein the plurality of tasks carried out by said processor includes a transfer task to transfer a partial amount per time of the moving image content from said recording medium to said internal memory and a reproduce task to reproduce the moving image content stored in said internal memory, wherein said reproduce task includes a set process to set a plurality of operation commands to a table and an output process to read out and output the moving image content stored in said internal memory, and said transfer task includes a seek process to seek a desired address on said recording medium in reference to the table and a content transfer process to transfer the moving image content corresponding to the partial amount from said recording medium to said internal memory in reference to the table.

2. A moving image reproducing apparatus according to claim 1, wherein said reproduce task further includes a comparison process to compare the number of unexecuted operation commands already set in the table but not yet executed with a threshold value and a wait process to wait for a predetermined time when the number of the unexecuted operation commands is greater than the threshold value.

3. A moving image reproducing apparatus according to claim 2, wherein the threshold value relies on a frame rate of the moving image content.

4. A moving image reproducing apparatus according to claim 1, wherein the set process includes an update process to cyclically update a transfer destination address of the moving image content and an address set process to set the transfer destination address updated by the update process to the table.

5. A moving image reproducing apparatus according to claim 1, wherein the moving image content includes a plurality of compressed still images, and the output process includes a decompress process to decompress each of the plurality of compressed still images.

* * * * *